(12) United States Patent
Sakayori et al.

(10) Patent No.: US 11,533,433 B2
(45) Date of Patent: Dec. 20, 2022

(54) IMAGING DEVICE, CONTROL METHOD, AND PROGRAM

(71) Applicant: Sony Group Corporation, Tokyo (JP)

(72) Inventors: Takahiro Sakayori, Tokyo (JP); Ayako Iwase, Kanagawa (JP); Mayuko Sato, Tokyo (JP); Mika Takahashi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/312,226

(22) PCT Filed: Dec. 17, 2019

(86) PCT No.: PCT/JP2019/049347
§ 371 (c)(1),
(2) Date: Jun. 9, 2021

(87) PCT Pub. No.: WO2020/137680
PCT Pub. Date: Jul. 2, 2020

(65) Prior Publication Data
US 2022/0053141 A1 Feb. 17, 2022

(30) Foreign Application Priority Data
Dec. 25, 2018 (JP) .............................. JP2018-241414

(51) Int. Cl.
*H04N 9/73* (2006.01)
*H04N 5/232* (2006.01)
(52) U.S. Cl.
CPC ....... *H04N 5/232935* (2018.08); *H04N 9/735* (2013.01)

(58) Field of Classification Search
CPC ...... H04N 1/6077; H04N 1/6086; H04N 9/73; H04N 9/735
USPC ......................................... 348/223.1, 333.02
See application file for complete search history.

(56) References Cited

U.S. PATENT DOCUMENTS 7,417,671 B2 * 8/2008 Sugimori ............... H04N 9/735
348/E9.052
7,525,697 B2 * 4/2009 Suekane .............. H04N 1/6027
348/222.1
9,912,927 B2 * 3/2018 Li .................... H04N 5/232935
(Continued)

FOREIGN PATENT DOCUMENTS

| JP | 2002-290813 A | 10/2002 |
| JP | 2006-54678 A | 2/2006 |
| WO | 2017/086299 A1 | 5/2017 |

OTHER PUBLICATIONS

International Search Report (PCT/ISA/210), International Application No. PCT/JP2019/049347, dated Mar. 3, 2020.
(Continued)

*Primary Examiner* — Anthony J Daniels
(74) *Attorney, Agent, or Firm* — Michael Best & Friedrich LLP (57) ABSTRACT

An imaging device including a control unit configured to: display a pre-capture screen for white balance data capture; display a confirmation screen displaying a captured value after capture subsequent to the pre-capture screen; and perform display control of transitioning to an adjustment screen for adjustment of the captured value, according to a user's operation on the confirmation screen.

20 Claims, 8 Drawing Sheets

(56) References Cited

U.S. PATENT DOCUMENTS

2003/0146984 A1* 8/2003 Sakaguchi ......... H04N 5/23222
                                                    348/333.02
2008/0062274 A1* 3/2008 Hamamura ...... H04N 5/232939
                                                     348/222.1
2018/0262733 A1* 9/2018 Aoki ..................... G03B 17/20

OTHER PUBLICATIONS

Notification of Transmittal of the International Search Report and the Written Opinion of the International Searching Authority, or the Declaration (PCT/ISA/220), International Application No. PCT/JP2019/049347, dated Mar. 17, 2020.

Written Opinion of the International Search Authority (PCT/ISA/237), International Application No. PCT/JP2019/049347, dated Mar. 17, 2020.

Sony Corporation, 2017, pp. 106-108, pp. 106-108, non-official translation ("Instruction manual of interchangeable lens camera α7RIII").

\* cited by examiner

Custom Setup

Custom 2

Press the ○ button to capture data of central area of screen.

[Menu] Cancel

FIG.7

Custom Setup

Custom 2

Captured the custom WB data.

2  >  4600K   A-B: 0   G-M: G7

▷ Select   ○ Enter   [Menu] Cancel

FIG.8

IMAGING DEVICE, CONTROL METHOD, AND PROGRAM

FIELD

The present disclosure relates to an imaging device, a control method, and a program.

BACKGROUND

In conventional white balance setting in a digital still camera, in addition to a setting mode using specified outdoor and indoor setting data, there are provided a mode in which setting is made by automatic capture of setting data and a mode in which setting is made by manual capture of setting data. In the mode in which setting is made by manual capture, setting data is captured by manual capture operation, for white balance setting.

For example, Patent Literature 1, which is described below, discloses a white balance setting method in which selection of a white balance setting mode and capture of setting data are facilitated by operation of one input unit, for white balance setting by manual capture of setting data.

CITATION LIST

Patent Literature
  Patent Literature 1: JP 2002-290813 A

SUMMARY

Technical Problem

However, adjustment of captured white balance data requires opening a white balance setting screen and transition of screens again, complicating the operation.

Solution to Problem

According to the present disclosure, an imaging device is provided that includes a control unit configured to: display a pre-capture screen for white balance data capture; display a confirmation screen displaying a captured value after capture subsequent to the pre-capture screen; and perform display control of transitioning to an adjustment screen for adjustment of the captured value, according to a user's operation on the confirmation screen.

According to the present disclosure, a control method is provided that causes a processor to perform: displaying a pre-capture screen for white balance data capture in an imaging device; displaying a confirmation screen displaying a captured value after capture subsequent to the pre-capture screen; and performing display control of transitioning to an adjustment screen for adjustment of the captured value, according to a user's operation on the confirmation screen.

According to the present disclosure, a program is provided that causes a computer to function as a control unit configured to: display a pre-capture screen for white balance data capture in an imaging device; display a confirmation screen displaying a captured value after capture subsequent to the pre-capture screen; and perform display control of transitioning to an adjustment screen for adjustment of the captured value, according to a user's operation on the confirmation screen.

DESCRIPTION OF EMBODIMENTS

Preferred embodiments of the present disclosure will be described in detail below with reference to the accompanying drawings. Note that In the present specification and the drawings, component elements having substantially the same functional configurations are designated by the same reference numerals and redundant description thereof will be omitted.

In addition, the description will be given in the following order.
1. Overview
2. Configuration example of imaging device 10
2-1. Appearance configuration example
2-2. Internal configuration example
3. White balance setting
4. Operation process
5. Conclusion

1. Overview

In an embodiment of the present disclosure, a mechanism will be proposed in which the number of steps for screen transition from a screen for capturing data to a screen for adjusting the captured data is improved to improve operability, for a white balance setting method applied to an imaging device 10.

2. Configuration Example of Imaging Device 10

<2-1. Appearance Configuration Example>

Figure 1:
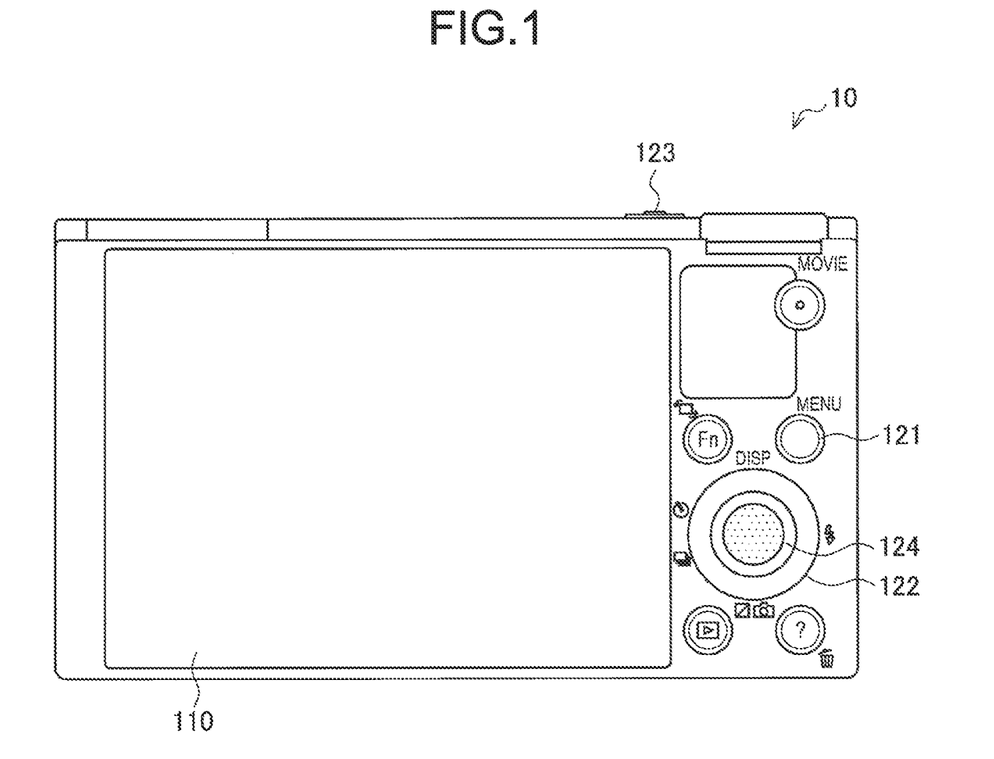
FIG. 1 is a diagram illustrating an example of an appearance configuration of the back side of an imaging device according to the present embodiment.

FIG. 1 is a diagram illustrating an example of an appearance configuration of the back side of the imaging device 10 according to the present embodiment. As illustrated in FIG. 1, the back surface of the imaging device 10 is provided with a display panel 110 and various operation switches 120 (e.g., a menu button 121, a control button 122 (e.g., arrow keys including an up key, a down key, a right key, and a left key) a display switch button, a video recording button, a playback button, a delete button, etc.). Furthermore, the imaging device 10 is provided with a shutter button 123.

In shooting, for example, an image sensed by an image sensor 132 is processed in real time and displayed on the display panel 110 (so-called live view display, and an image displayed in this way is called a "through-the-lens image"). A user is allowed to shoot while visually confirming the through-the-lens image displayed on the display panel 110. In addition, current setting contents are simply displayed on the display panel 110 by using icons, numerical values, or the like, and the user can readily confirm the setting contents. Note that the external configuration of the imaging device 10 illustrated in FIG. 1 is an example, and the respective configurations of the imaging device 10 according to the present embodiment are not limited to this external configuration, and further the presence/absence, shapes, and arrangement of the various operation switches are not also limited to this external configuration.

<2-2. Internal Configuration Example>

Figure 2:
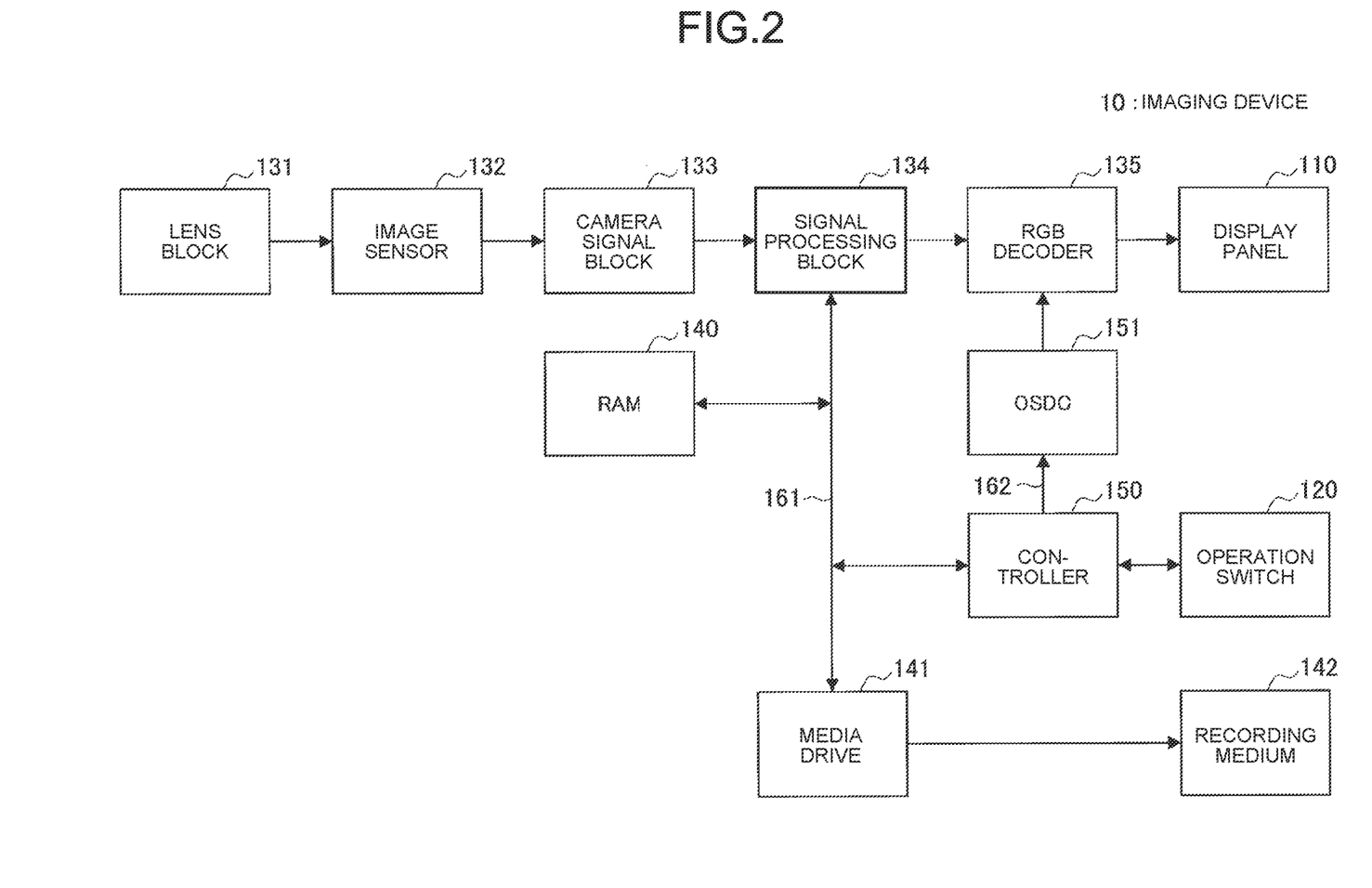
FIG. 2 is a block diagram illustrating an example of an internal configuration of the imaging device according to the present embodiment.

FIG. 2 is a block diagram illustrating an example of an internal configuration of the imaging device 10 according to the present embodiment. As illustrated in FIG. 2, the imaging device 10 includes a lens block 131, the image sensor 132, a camera signal block 133, a signal processing block 134, an RGB decoder 135, RAM 140, a media drive 141, a recording medium 142, a controller 150, OSDC 151, the display panel 110, and the r 120. Note that the internal configuration illustrated in FIG. 2 is an example of a specific hardware configuration, and the present embodiment is not limited to this internal configuration.

In FIG. 2, video light from an object (not illustrated) passes through the lens block 131 and is applied to the image sensor (charge coupled device (CCD)), complementary metal oxide semiconductor (CMOS), or the like) 132 configured to convert the video light into an electric signal.

The electric signal from the image sensor 132 is supplied to the camera signal block 133 and converted into a luminance signal (Y) and a color difference signal (Cb, Cr). Then, the converted signals pass through the signal processing block 134 straight, is supplied to the RGB decoder 135, and is converted into three primary color (R, G, B) signals, and thereby, an image is displayed on the display panel 110 (an example of a display unit, e.g., an LCD).

Furthermore, operation signals from various operation units and operation switch 120 such as an external key are supplied to the controller 150 that includes a microcomputer and the like. The controller 150 is a control unit includes, for example, a processor such as a central processing unit (CPU) or a digital signal processor (DSP). The processor executes a program stored in a memory such as a random access memory (RAM) or another storage medium to operate various functions of the imaging device 10 which is described later.

For example, when the shutter button 123 of the operation switches 120 is pressed, a control signal from the controller 150 is supplied to the signal processing block 134 through a bus 161, and image data of one screen is captured from the signal processing block 134 to the RAM 140 through the bus 161. In other words, control of the entire system, including such capture operation, is controlled by the controller 150 through the bus 161.

In the configuration example illustrated in FIG. 2, the signal processing block 134, the controller 150, the RAM 140, and the media drive 141 which is described later are connected via the bus 161. The control of the signal processing block 134 and the media drive 141 is controlled by the controller 150 through the bus 161, and the image data is also transferred through the bus 161.

Furthermore, the image data captured into the RAM 140 is compressed by the controller 150 according to a format such as Joint Photographic Expert Group (JPEG), a file header and the file are added to the image data, and the image data is formed into a data stream as an image file. Such an image file is configured to be transferred to the media drive 141 to be written on the recording medium 142 such as a memory card from the media drive 141.

Note that in the configuration example illustrated in FIG. 2, a semiconductor memory such as a memory card is assumed as the recording medium 142, but a built-in recording medium, such as magnetic disk, including a floppy (registered trademark) disk, or optical disk, including a CD-R, CD-RW, DVD-R, or DVD-RW, is also applicable to the recording medium 142.

Furthermore, the controller 150 is also configured to control the image file written in the recording medium 142 to be played back on the display panel 110. In this case, the image file written in the recording medium 142 is transferred to the RAM 140 through the media drive 141, the image data is extracted from the transferred image file, and the compressed file is decompressed while capturing the image data by the controller 150. When the decompressed image data is stored in another address of the RAM 140 again, the signal processing clock 134 reads the image data and supplies the image data to the RGB decoder 135, and in the RGB decoder 135, the image data is converted into the three primary color (R, G, B) signals to display the imaged on the display panel 110.

Furthermore, an on-screen display controller (OSDC) 151 is connected to the controller 150 via a serial communication line 162. A signal formed toy the on-screen display controller 151 is supplied to the decoder 135 and mixed with the image data from the signal processing block 134. Thereby, a menu screen, icons, and the like including symbols, characters, figures, and the like specified by the controller 150 are displayed at any position on the display panel 110.

In other words, for example, the internal setting of the controller 150 is supplied to the OSDC 151 as a control signal for an icon, and the icon is displayed at any position on the display panel 110. This configuration facilitates confirmation of the current setting contents visually on the display panel 110 by the user, for smooth shooting.

Furthermore, in response to an operation signal that is supplied from the menu button 121, control button 122, or the like of the operation switches 120 to the controller 150, the controller 150 creates an appropriate menu screen according to the contents of the operation, and the created menu screen is displayed on the display panel 110 via the OSDC 151.

An example of the internal configuration of the imaging device 10 according to the present embodiment has been described above. Note that the above description is an example, and the present embodiment is not limited to this description. For example, the imaging device 10 may have a communication interface and to transmit and receive data to and from an external device. The communication interface may be, for example, a wireless local area network (LAN), Bluetooth (registered trademark), Wi-Fi (registered trademark), or the like. Furthermore, some or all of the programs and data described herein may be obtained from an external data source (e.g., a data server, network storage, or external memory) without being stored in the RAM 140 or the recording medium 142.

Furthermore, in the present embodiment, a compact digital camera as illustrated in FIG. 1 is assumed as an example of the imaging device 10, but the imaging device 10 is not limited to this and nay be, for example, a digital video camera, a smartphone, a tablet terminal, or the like.

3. White Balance Setting

Next, white balance setting in the imaging device 10 according to the present embodiment will be described. In the present embodiment, in the capture (registration) of white balance setting data and the adjustment (e.g., 2-axis adjustment) of the captured (registered) data in the white balance setting, the number of steps of screen transition is improved to improve operability.

Figure 3:
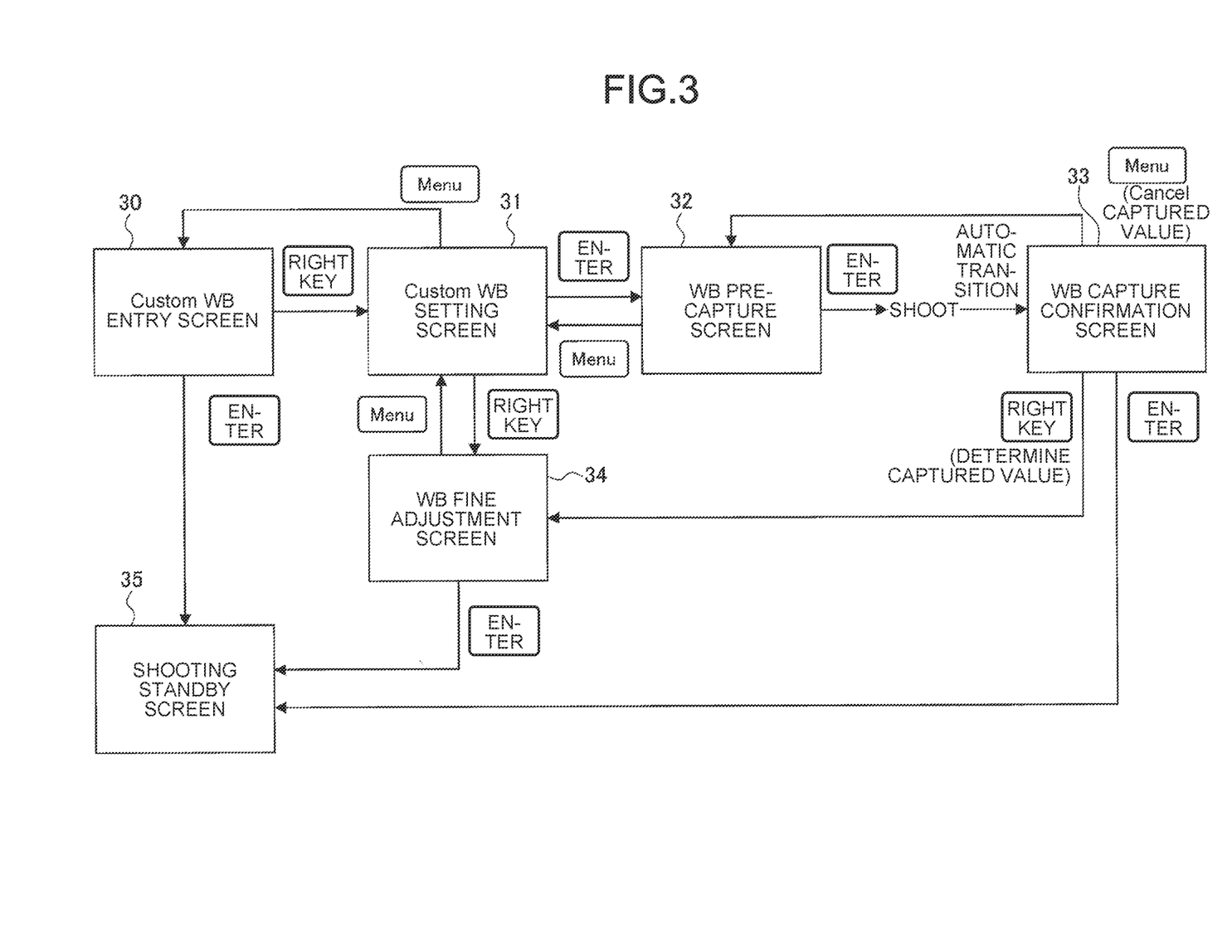
FIG. 3 is a diagram illustrating an example of screen transition in white balance setting made by the imaging device according to the present embodiment.

FIG. 3 is a diagram illustrating an example of the screen transition in white balance setting made by the imaging device 10 according to the present embodiment. Screens illustrated in FIG. 3 show embodiments of on-screen display (OSD) on the display panel 110. Note that specific display examples of the screens illustrated in FIG. 3 are illustrated in FIGS. 4 to 8.

First, a screen 30 illustrated in FIG. 3 is an entry screen for white balance data settings. The screen 30 is controlled in display by the controller 150, for example, when the menu button 121 is pressed. An example of such a screen 30 is illustrated in FIG. 4.

Figure 4:
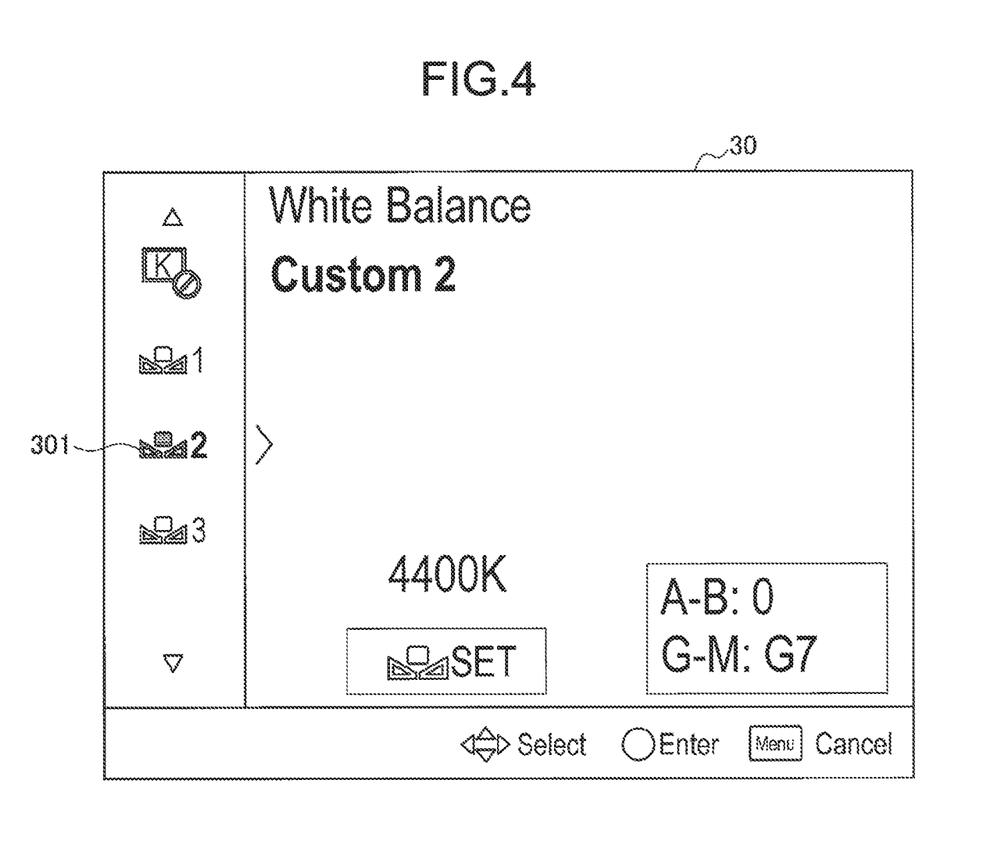
FIG. 4 is a diagram illustrating an example of an entry screen for white balance data setting according to the present embodiment.

As illustrated in FIG. 4, the screen 30 displays options 301 for selection of registration destinations 1 to 3 for the white balance data setting. In the present embodiment, for setting the white balance, a data registration destination is selected before data capture, and thus, the user can perform the capture operation after grasping the registration destination, further facilitating operation.

Next, when the right key is pressed while the screen 30 is displayed, the screen transitions to a screen 31 as illustrated in FIG. 3 The screen 31 is a white balance setting screen in the data registration destination selected on the screen 30. An example of such a screen 31 is illustrated in FIG. 5

Figure 5:
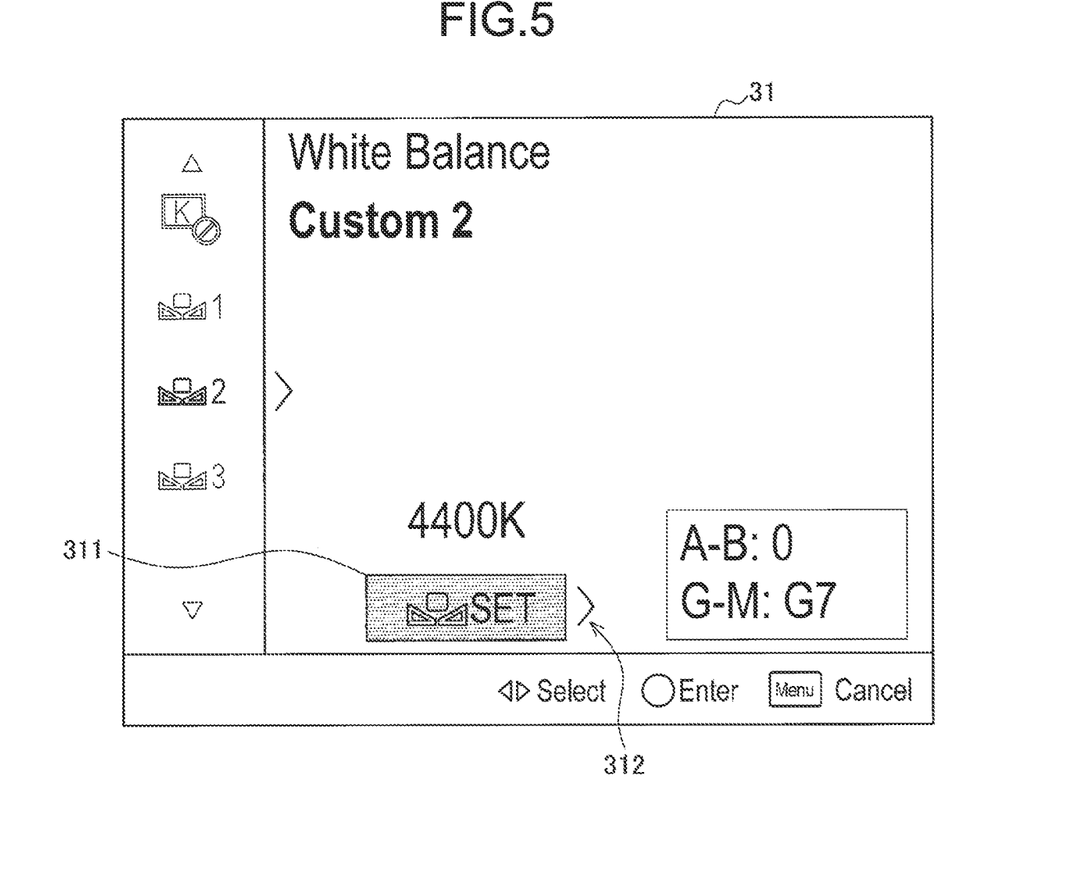
FIG. 5 is a diagram illustrating an example of a data setting screen for white balance according to the present embodiment.

As illustrated in FIG. 5, for example, when a registration destination 2 is selected, "White Balance Custom 2" is displayed on the screen 31. When data has already been registered in the registration destination 2, the contents of the data are displayed. The white balance data is expressed by color temperature (K (kelvin) that is the unit of thermodynamic temperature is used), and thereby, for example, as shown on the screen 31, the numeral value such as "4400K" that indicates the color temperature can be displayed as the contents of data. When new data is captured at the registration destination 2, such data can be overwritten and saved. The user is allowed to confirm set data of the registration destination 2 and then go on to new data capture. Specifically, for example, on the screen 31, a graphic user interface (GUI) button 311 for screen transition to a capture screen is displayed. The display example of the GUI button 311 illustrated in FIG. 5 is an example, and the contents of display, such as the shape and the like of the icon are not limited to this.

In the present embodiment, a trigger (GUI button 311) for screen transition to the capture screen is not aligned with menu icons as illustrated on the left side of FIG. 4, but displayed in the white balance setting screen displayed upon selecting a registration destination, as illustrated in FIG. 5, and thereby this configuration makes it possible to promptly transition (reduce the number of steps of screen transition) to a screen for data capture at a registration destination from the registration destination.

Furthermore, as illustrated in FIG. 5, an image 312 clearly indicating that, for example, the "right key" is allowed to be pressed is displayed around the GUI button 311. When the right key is pressed while the GUI button 311 is selected, the screen transitions to a screen 34 (e.g., 2-axis adjustment screen) that is configured to adjust the captured (registered) data, as illustrated in FIG. 3. As described above, in the present embodiment, it becomes possible to cause transition from the setting screen to the 2-axis adjustment screen in a single step. Here, the "right key" is used as an example, but the present invention is not limited to this, and an operation button indicating movement in another direction, such as the "down key" or "up key", may be used.

Note that when the menu button 121 is pressed on the screen 31, the screen returns to the screen 30.

Next, when an enter button 124 is pressed while the GUI button 311 is selected during the display of the screen 31, a screen 32 is displayed. The screen 32 is a pre-capture screen before capturing white balance data. An example of such a screen 32 is illustrated in FIG. 6.

Figure 6:
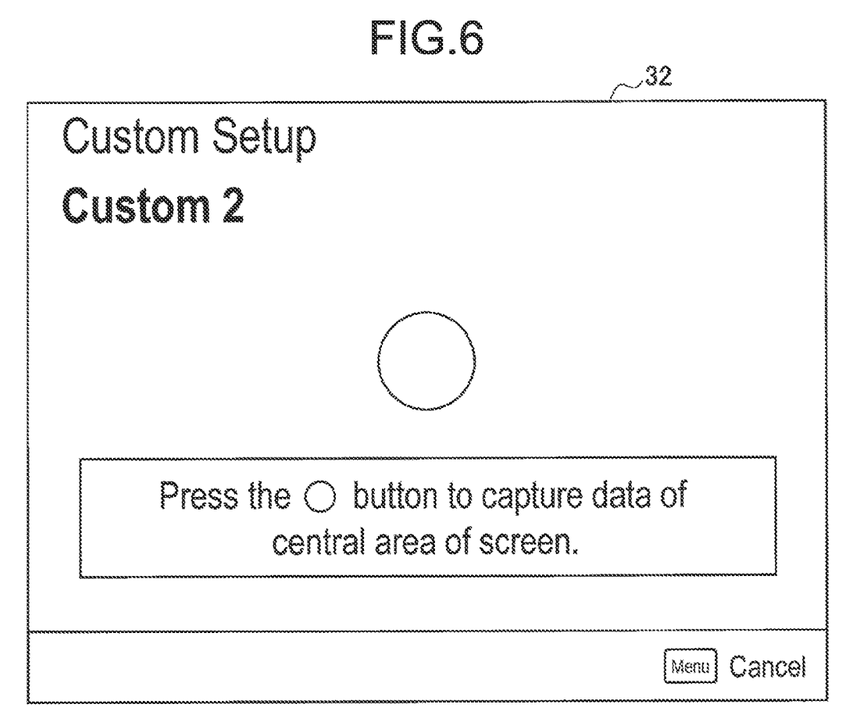
FIG. 6 is a diagram illustrating an example of a pre-capture screen before capturing white balance data according to the present embodiment.

As illustrated in FIG. 6, on the screen 32, a description ("Press enter button to capture data of central area of screen", etc.) that prompts the user to perform a data capture operation is displayed.

When the user presses the enter button 124 during the display of the screen 32, shooting (i.e., data capture) is performed, and a screen 33 for confirming data captured is displayed. After the shooting, the screen is automatically transitioned to the screen 33. An example of such a screen 32 is illustrated in FIG. 7.

Figure 7:
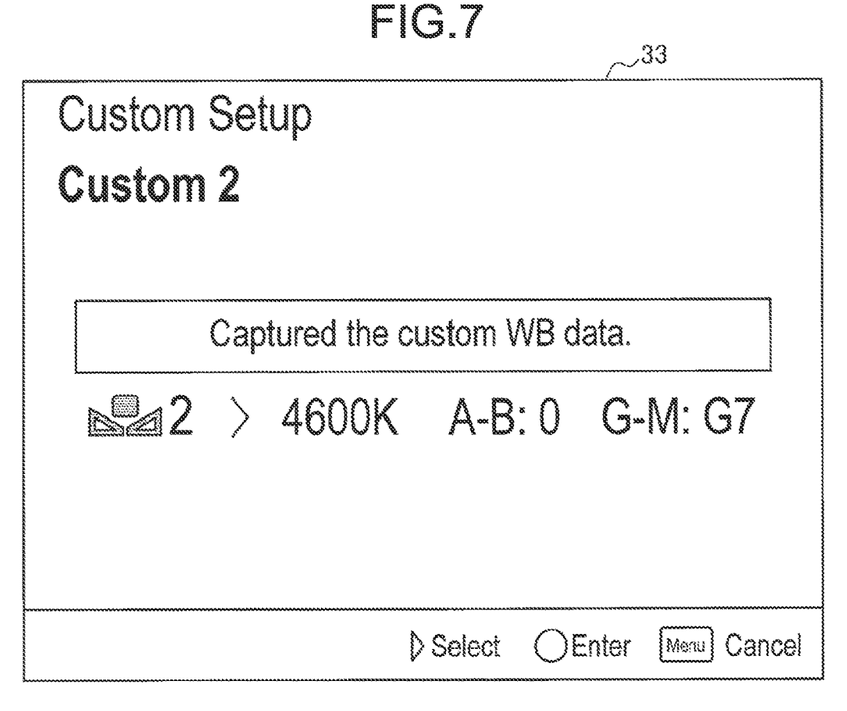
FIG. 7 is a diagram illustrating an example of a confirmation screen for white balance data capture according to the present embodiment.

As illustrated in FIG. 7, on the screen 33, white balance data captured is displayed, and the user can confirm the registered contents. In addition, a capture destination (registration destination) is clearly indicated on the screen 33 (e.g., "Custom 2" is displayed).

To cancel a captured value, for example, the menu button 121 is pressed. When the menu button 121 is pressed during the display of the screen 33, the controller 150 cancels the captured value and returns the display screen on the display panel 110 to the screen 32. The user can shoot (capture) again.

To register the captured value as it is, for example, the enter button 124 is pressed. When the enter button 124 is pressed during the display of the screen 33, the controller 150 registers the captured value and causes transition of the display screen on the display panel 110 to a screen 35. The screen 35 is, for example, a shooting standby screen in which, for example, a through-the-lens image is displayed. On the screen 35, the current setting contents can be simply displayed by icons, numerical values, and the like.

Meanwhile, if a captured value needs to be adjusted, for example, the right key is pressed. As shown on the screen 33, for example, information added to footer information clearly indicates that the right key is selectable, and it becomes possible to promote transition to an adjustment screen for the captured value. Note that the "right key" is used as an example here, the present embodiment is not limited to this, and another operation switch may be used.

Figure 8:
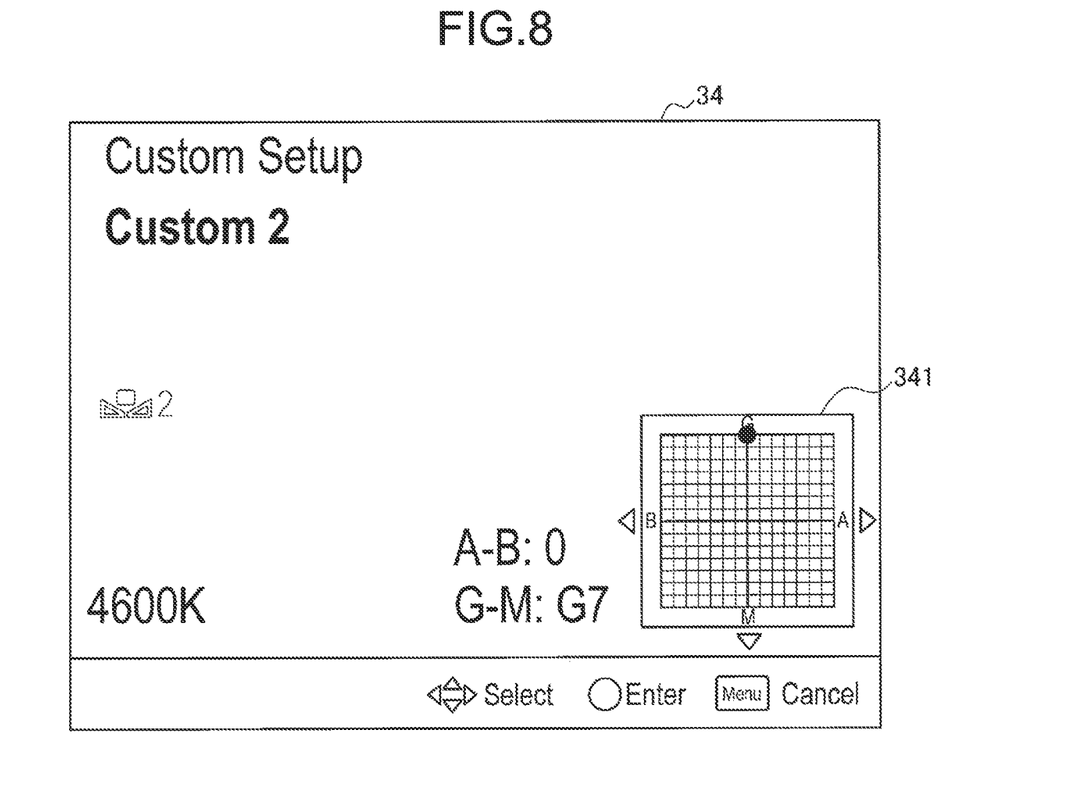
FIG. 8 is a diagram illustrating an example of an adjustment screen for adjusting a captured value according to the present embodiment.

When the right key is pressed during the display of the screen 33, the controller 150 determines the captured value and then causes transition of the display screen on the display panel 110 to the screen 34. The screen 34 is the adjustment screen for adjusting the captured value.

On the screen 34, a 2-axis adjustment UI 341 for adjusting the captured value, for example, on an A (amber)-B (blue) axis and a G (green)-M (magenta) axis is displayed. In the 2-axis adjustment UI 341, it is possible to directly change the color temperature by moving a cursor. The cursor is configured to be moved, for example, by the control button 122 (the control button 122 includes the up key for moving the cursor upward, the down key for moving the cursor downward, the right key for moving the cursor rightward, and the left key for moving the cursor leftward). The method of adjusting the captured value which is described here is an example, and the present embodiment is not limited to this example.

When the adjustment is finished, the user presses the enter button 124. When the enter button 124 is pressed during the display of the screen 34, the controller 150 causes transition of the display screen on the display panel 110 to the screen 35 after registration of the adjusted captured value.

Meanwhile, to cancel an adjustment value, the user presses the menu button. When the menu button 121 is pressed during the display of the screen 34, the controller 150 cancels the adjustment value and then causes transition of the display screen on the display panel 110 to the screen 31. Note that since the captured value has already been determined, the determined captured value may be configured to be registered, when the adjustment value is canceled. This makes it possible to cancel only the adjustment value, when the adjustment is performed accidentally.

Furthermore, the screen transition may be configured to be performed after determining the value, when screen transition is performed by an operation switch other than the predetermined menu button 121, such as half-pressing the shutter button 123, during the display of the screen 33 and the screen 34.

As described above, in the present embodiment, it is possible to perform image transition directly from the confirmation screen for captured value to the adjustment screen in a single step, for the white balance setting, improving operability.

Furthermore, the first determination of the registration destination of the captured value makes it possible to operate the captured value after grasping the registration destination.

4. Operation Process

Figure 9:
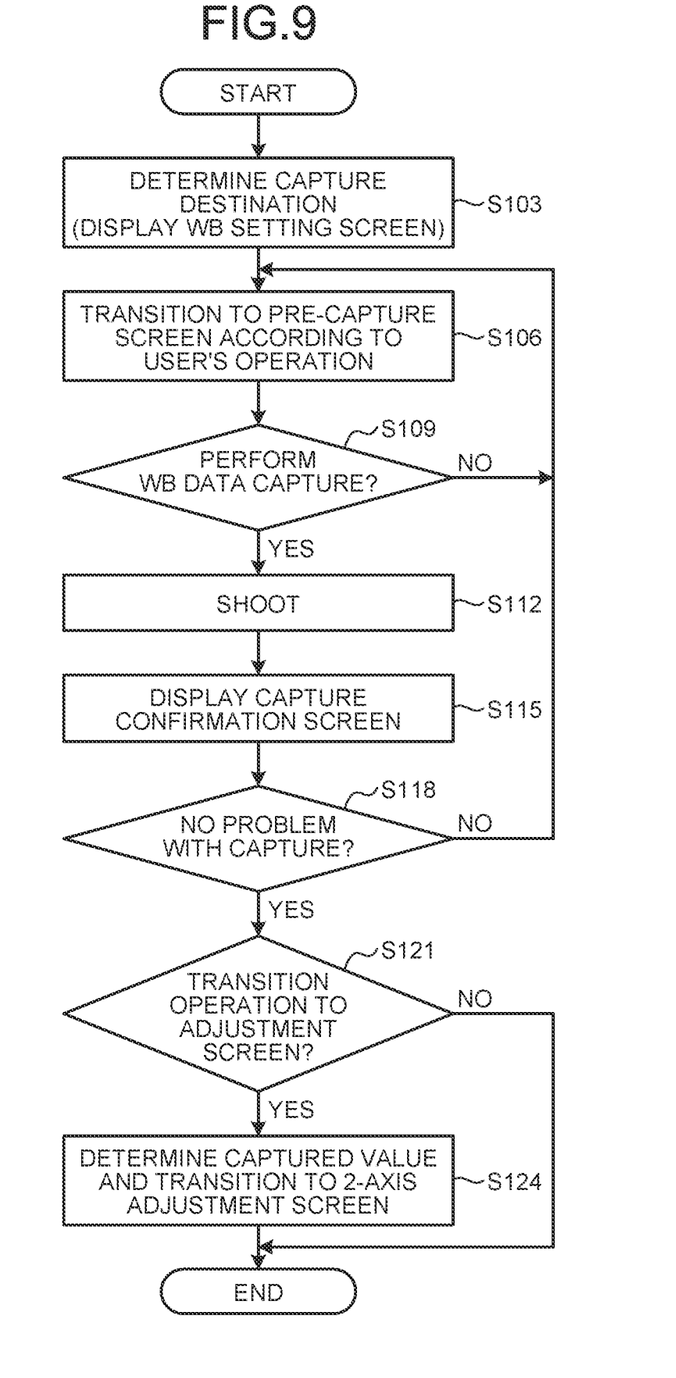
FIG. 9 is a flowchart illustrating an example of a white balance setting process in the imaging device according to the present embodiment.

FIG. 9 is a flowchart illustrating an example of a white balance setting process in the imaging device according to the present embodiment.

As illustrated in FIG. 9, if a capture destination (registration destination) is determined by the user on the entry screen (screen 30) for white balance setting, the controller 150 of the imaging device 10 displays the white balance setting screen (screen 31) in the determined capture destination, first (Step S103).

Next, according to predetermined user's operation, such as pressing the GUI button 311 for transition from the screen 31 to the capture screen, the controller 150 causes transition of the display screen to the pre-capture screen (screen 32) (Step S106).

Next, if the user's operation, such as pressing the enter button 124 is performed, the controller 150 determines that capture of white balance data is performed (Step S109/Yes), and shoots (Step S112).

Subsequently, the controller 150 displays the confirmation screen (screen 33) for displaying data captured by the shooting (Step S115).

Next, if there is a problem with the capture (Step S118/No), the screen returns to the pre-capture screen (screen 32), and white balance data is captured (shooting) again. An example of the problem with capturing the data includes, for example, a case where desired shooting cannot be performed due to camera shake and the captured value is significantly different from an expected value. In capturing the white balance data according to the present embodiment, for example, when, even though data should be captured on the basis of "white" in determining the value, data is captured on the basis of "black" due to camera shake or the like, a greenish image is expected to be obtained, and it can be said that there is a problem with capturing data.

Meanwhile, if there is no problem in capturing the data (Step S118/No) but there is a transition operation to the adjustment screen (e.g., pressing the "right key") by the user (Step S121/Yes), the controller 150 causes transition to the 2-axis adjustment screen (screen 34) after determining the captured value (Step S124).

An example of an operation process according to the present embodiment has been described above. The operation process illustrated in FIG. 9 is an example, and the present embodiment is not limited to this operation process.

5. Conclusion

As described above, preferred embodiments of the present disclosure have been described in detail with reference to the accompanying drawings, but the present disclosure is not limited to these examples. A person skilled in the art may obviously find various alternations or modifications within the technical scope of the appended claims, and it should be understood that they will naturally come under the technical scope of the present disclosure.

Furthermore, it is also possible to create a computer program for causing hardware such as CPU, ROM, and RAM incorporated in the imaging device 10 described above to perform functions of the imaging device 10. In addition, a computer-readable storage medium storing such a computer program is also provided.

In addition, the effects described herein are merely illustrative and demonstrative and are not limitative. In other words, the technology according to the present disclosure can exhibit, along with or instead of the effects, other effects apparent to those skilled in the art from the description herein.

Additionally, the present technology may also be configured as below.

(1) An imaging device comprising
a control unit configured to:
display a pre-capture screen for white balance data capture;
display a confirmation screen displaying a captured value after capture subsequent to the pre-capture screen; and
perform display control of transitioning to an adjustment screen for adjustment of the captured value, according to a user's operation on the confirmation screen.

(2) The imaging device according to (1), wherein
the control unit
displays an image promoting an operation for transition to the adjustment screen, on the confirmation screen.

(3) The imaging device according to (1) or (2), wherein
the control unit
determines the captured value to transition to the adjustment screen.

(4) The imaging device according to any one of (1) to (3), wherein
the control unit
displays a setting screen for setting of white balance data in a selected registration destination, and
performs display control of transitioning to the pre-capture screen according to operation on the setting screen.

(5) The imaging device according to (4), wherein
the control unit displays an operation button image for transition to the pre-capture screen on the setting screen.

(6) The imaging device according to (4) or (5), wherein the control unit displays an image prompting an operation for transition to the adjustment screen, on the setting screen.

(7) The imaging device according to (3), wherein the control unit deletes an adjustment value and registers the determined captured value, when a cancel operation is performed on the adjustment screen.

(8) The imaging device according to any one of (1) to (7), wherein the control unit registers an adjusted captured value according to a determination operation on the adjustment screen.

(9) A control method comprising causing a processor to perform:

displaying a pre-capture screen for white balance data capture in an imaging device;

displaying a confirmation screen displaying a captured value after capture subsequent to the pre-capture screen; and performing display control of transitioning to an adjustment screen for adjustment of the captured value, according to a user's operation on the confirmation screen.

(10) A program causing a computer to function as a control unit configured to:

display a pre-capture screen for white balance data capture in an imaging device;

display a confirmation screen displaying a captured value after capture subsequent to the pre-capture screen; and perform display control of transitioning to an adjustment screen for adjustment of the captured value, according to a user's operation on the confirmation screen.

REFERENCE SIGNS LIST

10 IMAGING DEVICE
110 DISPLAY PANEL
120 OPERATION SWITCH
121 MENU BUTTON
122 CONTROL BUTTON
123 SHUTTER BUTTON
124 ENTER BUTTON
131 LENS BLOCK
132 SEMICONDUCTOR IMAGE SENSOR
132 IMAGE SENSOR
133 CAMERA SIGNAL BLOCK
134 SIGNAL PROCESSING BLOCK
135 DECODER
141 MEDIA DRIVE
142 RECORDING MEDIUM
150 CONTROLLER
151 ON-SCREEN DISPLAY CONTROLLER (OSDC)
161 BUS
162 SERIAL COMMUNICATION LINE
301 OPTION
311 GUI BUTTON

The invention claimed is:

1. An imaging device comprising:
a control unit configured to:
display a pre-capture screen for white balance data capture;
display a confirmation screen displaying a captured value after capture from the pre-capture screen; and
perform a display control of transitioning to an adjustment screen for adjustment of the captured value, according to a user's operation on the confirmation screen,
wherein the captured value is a white balance value and the confirmation screen does not display other white balance values, and
wherein the captured value is adjustable on the adjustment screen and the adjustment screen does not adjust the other white balance values.

2. The imaging device according to claim 1, wherein the control unit is further configured to display an image promoting an operation for transition to the adjustment screen, on the confirmation screen.

3. The imaging device according to claim 1, wherein the control unit is further configured to:
perform display control of transitioning to the adjustment screen for adjustment of a second captured value, and
determine the second captured value when it is to transition to the adjustment screen.

4. The imaging device according to claim 3, wherein the control unit is further configured to:
receive a cancel operation at the adjustment screen,
delete an adjustment value in response to receiving the cancel operation, and
register the determined second captured value in response to deleting the adjustment value.

5. The imaging device according to claim 1, wherein the control unit is further configured to:
display a setting screen for setting of white balance data in a selected registration destination, and
perform display control of transitioning to the pre-capture screen according to operation on the setting screen.

6. The imaging device according to claim 5, wherein the control unit is further configured to display an operation button image for transition to the pre-capture screen on the setting screen.

7. The imaging device according to claim 5, wherein the control unit is further configured to display an image prompting an operation for transition to the adjustment screen, on the setting screen.

8. The imaging device according to claim 1, wherein the control unit is further configured to register an adjusted captured value according to a determination operation on the adjustment screen.

9. The imaging device according to claim 1, wherein the adjustment screen includes a two-axis adjustment user interface.

10. A control method comprising:
controlling, with an electronic processor, a display to display a pre-capture screen for white balance data capture in an imaging device;
controlling, with the electronic processor, the display to display a confirmation screen displaying a captured value after capture from the pre-capture screen; and
performing, with the electronic processor, a display control of transitioning the display to an adjustment screen for adjustment of the captured value, according to a user's operation on the confirmation screen,
wherein the captured value is a white balance value and the confirmation screen does not display other white balance values, and wherein the captured value is adjustable on the adjustment screen and the adjustment screen does not adjust the other white balance values.

11. The control method according to claim 10, further comprising:

displaying an image promoting an operation for transition to the adjustment screen, on the confirmation screen.

12. The control method according to claim 10, further comprising:

perform display control of transitioning to the adjustment screen for adjustment of a second captured value; and determining the second captured value when it is to transition to the adjustment screen.

13. The control method according to claim 12, further comprising:

receiving a cancel operation at the adjustment screen;

deleting an adjustment value in response to receiving the cancel operation; and registering the determined second captured value in response to deleting the adjustment value.

14. The control method according to claim 10, further comprising:

displaying a setting screen for setting of white balance data in a selected registration destination; and performing display control of transitioning to the pre-capture screen according to operation on the setting screen.

15. The control method according to claim 14, further comprising:

displaying an operation button image for transition to the pre-capture screen on the setting screen.

16. The control method according to claim 14, further comprising:

displaying an image prompting an operation for transition to the adjustment screen, on the setting screen.

17. The control method according to claim 10, further comprising:

registering an adjusted captured value according to a determination operation on the adjustment screen.

18. The control method according to claim 10, wherein the adjustment screen includes a two-axis adjustment user interface.

19. A non-transitory computer-readable medium comprising a program that, when executed by an electronic processor, causes the electronic processor to perform a set of operations comprising:

controlling a display to display a pre-capture screen for white balance data capture in an imaging device;

controlling a display to display a confirmation screen displaying a captured value after capture from the pre-capture screen; and performing a display control of transitioning to an adjustment screen for adjustment of the captured value, according to a user's operation on the confirmation screen, wherein the captured value is a white balance value and the confirmation screen does not display other white balance values, and wherein the captured value is adjustable on the adjustment screen and the adjustment screen does not adjust the other white balance values.

20. The non-transitory computer-readable medium according to claim 19, wherein the adjustment screen includes a two-axis adjustment user interface.

* * * * *